US006336084B1

United States Patent
Omara et al.

(10) Patent No.: US 6,336,084 B1
(45) Date of Patent: Jan. 1, 2002

(54) THREE-WAY CATALYST MODEL FOR AN ENGINE AIR-TO-FUEL RATIO CONTROL SYSTEM

(75) Inventors: Ahmed Abdelaziz Omara, Ann Arbor; Douglas Ray Hamburg, Bloomfield Hills; John Edward Bradley, Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/309,779

(22) Filed: May 11, 1999

(51) Int. Cl.[7] .............................. G06G 7/48; F01N 3/00
(52) U.S. Cl. ............................................. 703/8; 60/274
(58) Field of Search .................................. 703/8; 60/274

(56) References Cited

U.S. PATENT DOCUMENTS

| | | | |
|---|---|---|---|
| 4,903,305 A | * 2/1990 | Gillick et al. | 704/245 |
| 5,214,915 A | 6/1993 | Schneider | |
| 5,249,954 A | * 10/1993 | Allen et al. | 431/14 |
| 5,293,584 A | * 3/1994 | Brown et al. | 704/277 |
| 5,419,122 A | * 5/1995 | Tabe et al. | 60/274 |
| 5,475,975 A | 12/1995 | Nasu | |
| 5,609,023 A | 3/1997 | Katoh et al. | |
| 5,625,750 A | 4/1997 | Puskorius et al. | |
| 5,682,317 A | 10/1997 | Keeler et al. | |
| 5,691,546 A | * 11/1997 | Morishita | 257/19 |
| 5,784,879 A | 7/1998 | Dohta et al. | |
| 5,865,626 A | * 2/1999 | Beattie et al. | 434/185 |
| 5,917,730 A | * 6/1999 | Rittie et al. | 703/6 |
| 5,960,181 A | * 9/1999 | Sanadidi et al. | 703/21 |
| 5,960,392 A | * 9/1999 | Sundberg et al. | 704/236 |
| 5,981,316 A | * 11/1999 | Yamada et al. | 438/128 |

OTHER PUBLICATIONS

Barros et al.; "Multimodels and dynamic structure models: an integration of DSDE/DEVs and OOPM"; Proc. 1998 Win. Sim. Conf.; pp. 413–419, Dec. 1998.*
Deng; "A dynamic feature–based approach to speech modeling recognition"; IEEE Workshop on Automatic speech recog. & Understanding; pp. 107–114, Dec. 1997.*
Article: "Transient Modeling of 3–Way Catalytic Converters", SAE International Feb. 28–Mar. 3, 1994 (940934).
Article: "Indirect Adaptive Control of a Three–Way Catalyst", SAE International Feb. 26–29, 1996 (961038).
Article: "Model–Based Fuel Injection Control System for SI Engines", SAE International, May 6–8, 1996 (961188).

* cited by examiner

Primary Examiner—Kevin J. Teska
Assistant Examiner—Hugh Jones
(74) Attorney, Agent, or Firm—Allan J. Lippa

(57) ABSTRACT

A three-way catalyst model (50) and a method for modeling the dynamic response of a three-way catalyst that divides the catalyst response into sub-regions (1–7). A sub-model (44) is constructed that represents each sub-region (1–7). Each sub-model (44) is assigned unique attributes at which the sub-model is activated. The attributes are based on the system parameters and states. The states may be either continuous or discrete and define a hybrid state space. A larger or smaller number of sub-regions (1–7) can be utilized based on the model's (50) use and the accuracy desired for the model (50).

3 Claims, 6 Drawing Sheets

THREE-WAY CATALYST MODEL FOR AN ENGINE AIR-TO-FUEL RATIO CONTROL SYSTEM

TECHNICAL FIELD

The present invention relates to a system for controlling an air-to-fuel ratio in an internal combustion engine. More particularly, the present invention relates to a novel three-way catalyst model in a control feedback loop for an engine air-to-fuel ratio (A/F) control system.

BACKGROUND OF THE INVENTION

Government regulations concerning the release into the atmosphere of various exhaust emission constituents from automotive vehicles are becoming increasingly more stringent. As the regulations relating to emissions of oxides of nitrogen, carbon monoxide, and unburned hydrocarbons become more stringent, it is necessary to control the engine air-to-fuel ratio (A/F) to avoid unnecessary instabilities and minimize undesirable tailpipe exhaust emissions.

A fore-aft oxygen sensor (FAOS) fuel control system 100 is shown in FIG. 1. The control system 100 uses an A/F bias 102 for trimming the closed-loop operating point of a pre-catalyst A/F feedback controller 104. The A/F bias 102 is generated by a proportional-integral feedback signal from a post-catalyst EGO sensor feedback controller 106 fed by the output of a post-catalyst Exhaust Gas Oxygen (EGO) sensor 108.

A substantial time delay is associated with the post-catalyst feedback loop. Therefore, this control system 100 is subject to some A/F errors. A/F errors result in catalyst breakthrough and higher emission levels, making it difficult to meet the stringent emission regulations.

In an attempt to improve the performance of the FAOS control system, it has been proposed to use a model-based feedback controller. In the model-based system, the inputs to the system to be controlled are also applied to a model. The model is adaptively updated based upon a comparison between the output of the model and the output of the actual system. The output of the model is used to generate a real-time corrective signal to rapidly compensate for potential, or present, system response errors. The accuracy of the model is important to the success of the model-based system.

The three-way catalyst (TWC) model is one of the principal elements affecting the accuracy of the model-based system. In this regard, there are two types of TWC models. The first is known as a first principles model and is based on reaction kinetics and gas adsorption/desorption on the catalyst surface. The first principles model is usually expressed in coupled partial differential equations that are computationally too complex to be used for control purposes. An example of this type of TWC model is described in the 1994 SAE paper 940934, "Transient Modeling of 3-Way Catalytic Converters" by K. N. Pattas, et al.

The second type of TWC model is a control-oriented model. Models of this type, that have been proposed thus far, are generally single state models that are unable to capture the complex dynamic behavior of the TWC over a wide range of operation. Examples of this type of TWC model are described in the 1996 SAE paper 961038, "Indirect Adaptive Control of a Three-Way Catalyst" by E. Shafai, et al. and the 1996 SAE paper 961188, "Model-Based Fuel Injection Control System for SI Engines" by M. Nasu et al. FIG. 2 is an example of the output of the control-oriented model 110 described by Shafai et al. in comparison to measured A/F 120 at the TWC output. The triangular pattern of the model's output only crudely approximates the measured A/F.

SUMMARY OF THE INVENTION

The present invention is a three-way catalyst model that accurately represents the dynamic response of the three-way catalyst over its entire range of operation. The model of the present invention divides the TWC response into distinct sub-regions that are each represented by its own unique sub-model. With the present invention, it is possible to build a highly accurate TWC model covering a wide range of operation without overly complex computations.

Each of the sub-regions of the TWC model in accordance with the present invention has a sub-model that may have different levels of complexity and may be based on different modeling techniques. The TWC model of the present invention uses a hybrid state space, containing continuous and discrete states, to define the state of the TWC and to determine when to apply the suitable sub-model for each sub-region.

One object of the present invention is to accurately model the complex behavior of a dynamic system. Another object of the present invention is to model the complex behavior of a Three-Way Catalyst (TWC). Yet another object is to accurately model the TWC without unduly complicated partial differential equations.

A further object of the present invention is to provide a TWC model that has a hybrid state space including continuous and discrete states. It is yet a further object of the present invention to divide the TWC behavior into distinct sub-regions, assign unique attributes to each sub-region, and model each sub-region with an appropriate sub-model.

Yet a further object of the present invention is to define metrics that help quantify and understand the behavior of an automotive TWC. It is still a further object of the present invention to use the novel TWC model in a control feedback loop for an engine A/F control system. It is yet another object of the present invention to isolate and define different dynamic phenomena in the TWC dynamic behavior.

Other objects and advantages of the invention will become apparent upon reading the following detailed description and appended claims, and upon reference to the accompanying drawings.

DESCRIPTION OF THE PREFERRED EMBODIMENT

While the present invention is described herein with reference to using a Three-Way Catalyst (TWC) model for A/F control, it is understood by one skilled in the art of dynamic systems modeling that the present invention is general and is applicable to a variety of purposes other than A/F control. It should also be noted that the model of the present invention is applicable not only to system control, but design, analysis and implementation as well.

Figure 3:
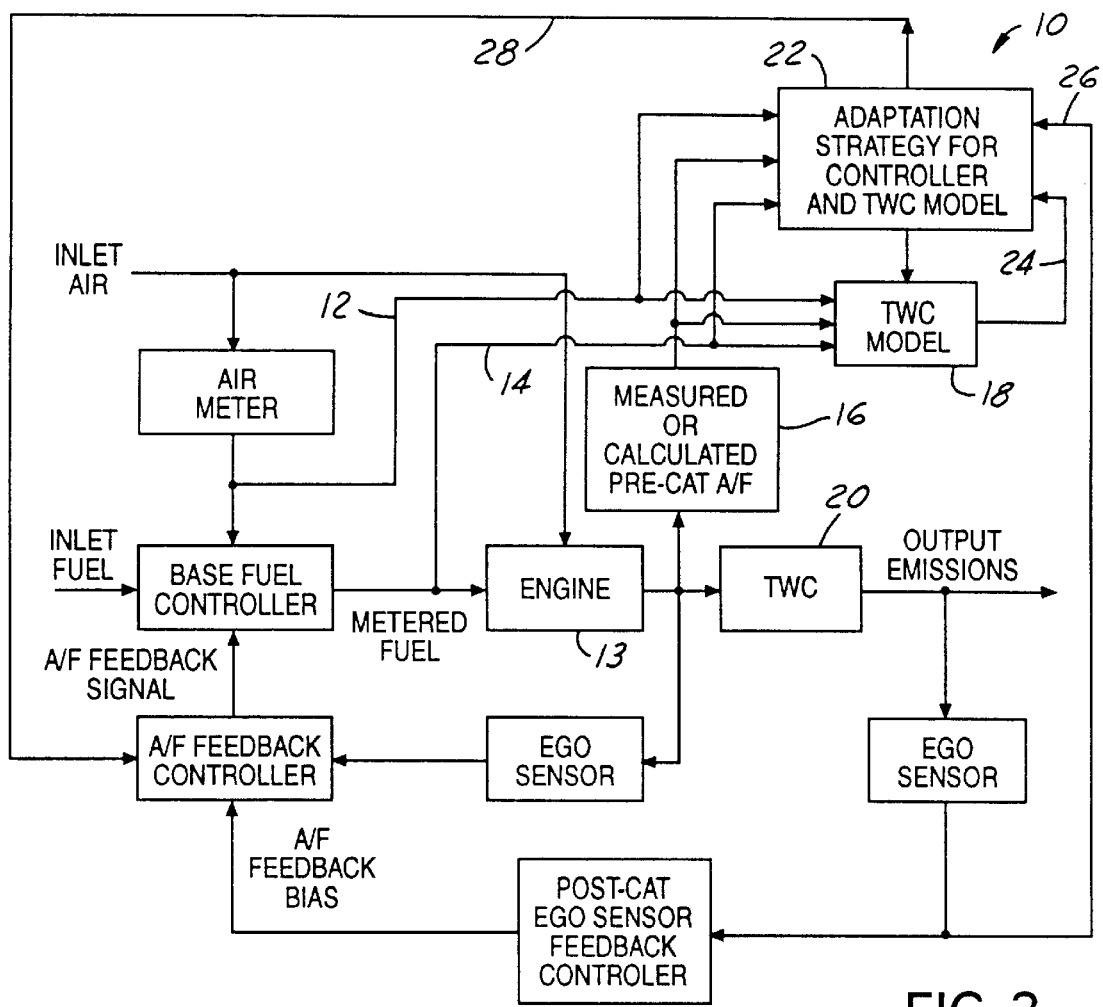
FIG. 3 is a block diagram of a model-based A/F feedback control system.

FIG. 3 is a block diagram of a model-based FAOS feedback control system. In the model-based system 10, the measured inlet air input 12 to the engine 13, the measured inlet fuel input 14 to the engine 13, and a measured A/F 16 before the catalyst are applied to a model 18 of the system. The model 18 is adaptively updated by an adaption strategy 22 based upon the output 24 of the TWC model 18 compared to the measured output 26 of the actual TWC system 20. The output 24 of the model is used, (along with other signals), to generate a real-time corrective signal 28 to rapidly compensate for system response errors.

Figure 1:
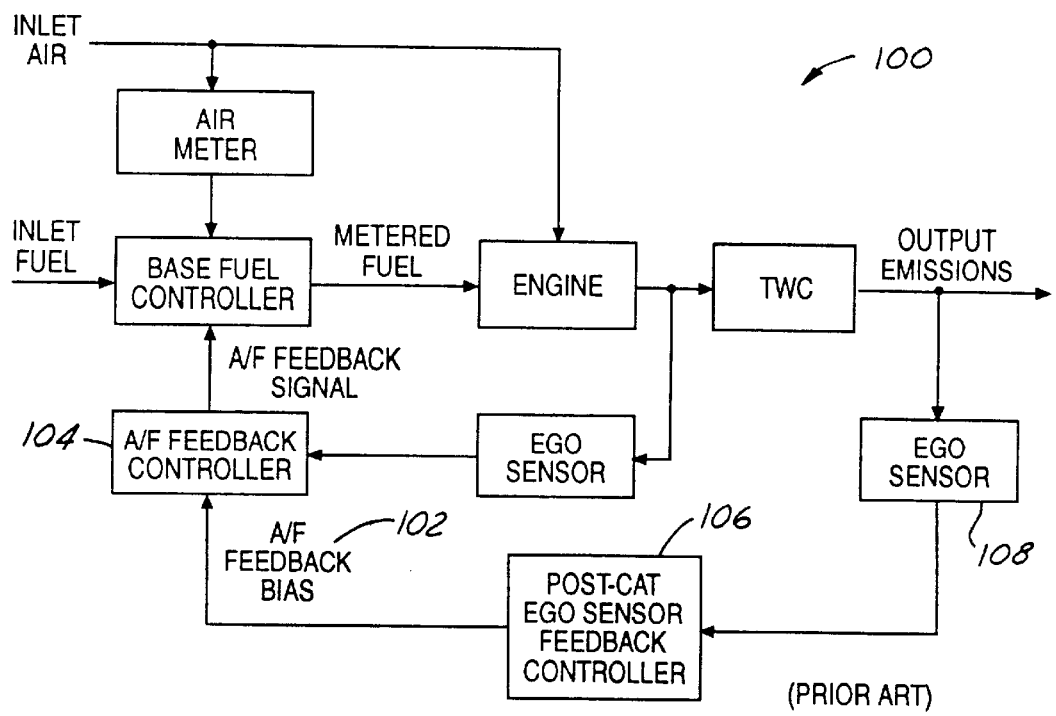
FIG. 1 is a block diagram of a basic A/F feedback control system.
Figure 4:
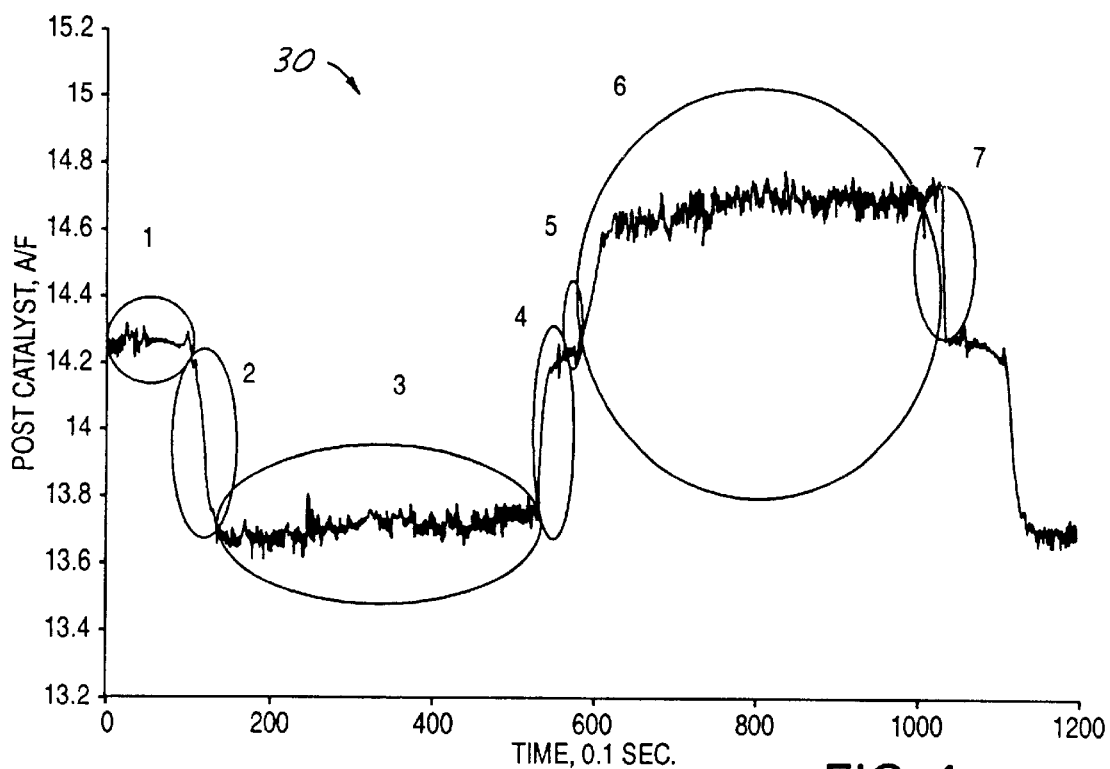
FIG. 4 is a graph of typical post-catalyst A/F behavior, for a square wave A/F input, divided into seven sub-regions according to the present invention.
Figure 2:
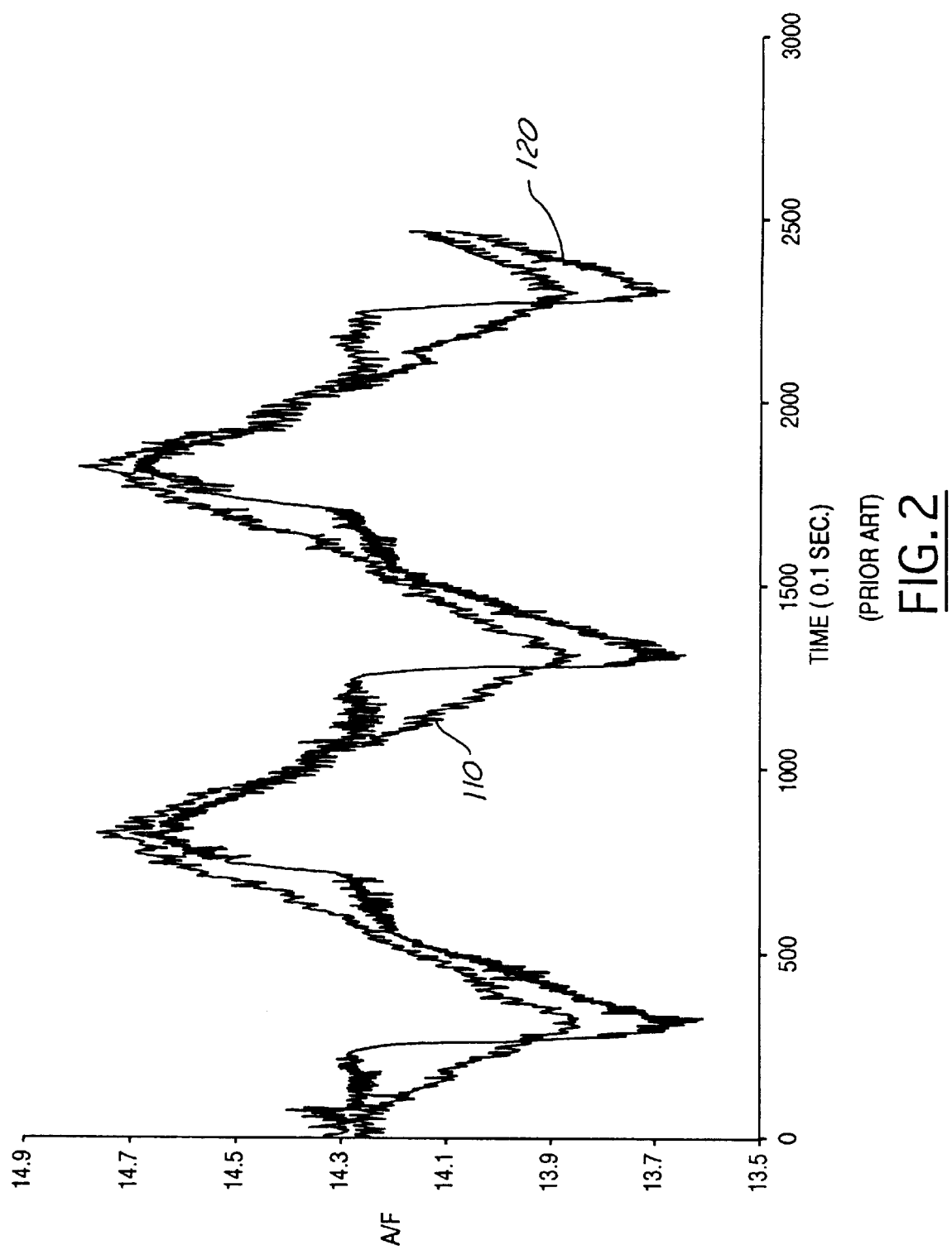
FIG. 2 is a graph comparing the A/F prediction of a typical prior art control-oriented TWC model with a measured A/F.

The TWC model of the present invention subdivides the behavior of the TWC into distinctive sub-regions. FIG. 4 is an example of a typical post-catalyst A/F behavior 30, for a square wave centered around the stoichiometry A/F, divided into seven sub-regions identified as 1 through 7. A basic understanding of linear dynamic systems behavior is needed to divide the model at this stage. As seen in FIG. 4, each sub-region corresponds to a change in the plot of the graph. More sub-regions can be recognized depending on the specific application. Further subdivision will increase the accuracy of the model. Designating more sub-regions requires an understanding of the system being modeled, and in the present example, a working knowledge of TWC dynamic behavior.

Once the sub-regions are designated, unique attributes are assigned to each sub-region and a sub-model is constructed for each sub-region. The attributes assigned to each sub-region determine when a particular sub-model should be invoked to simulate the TWC dynamic behavior in the corresponding sub-region.

Figure 5:
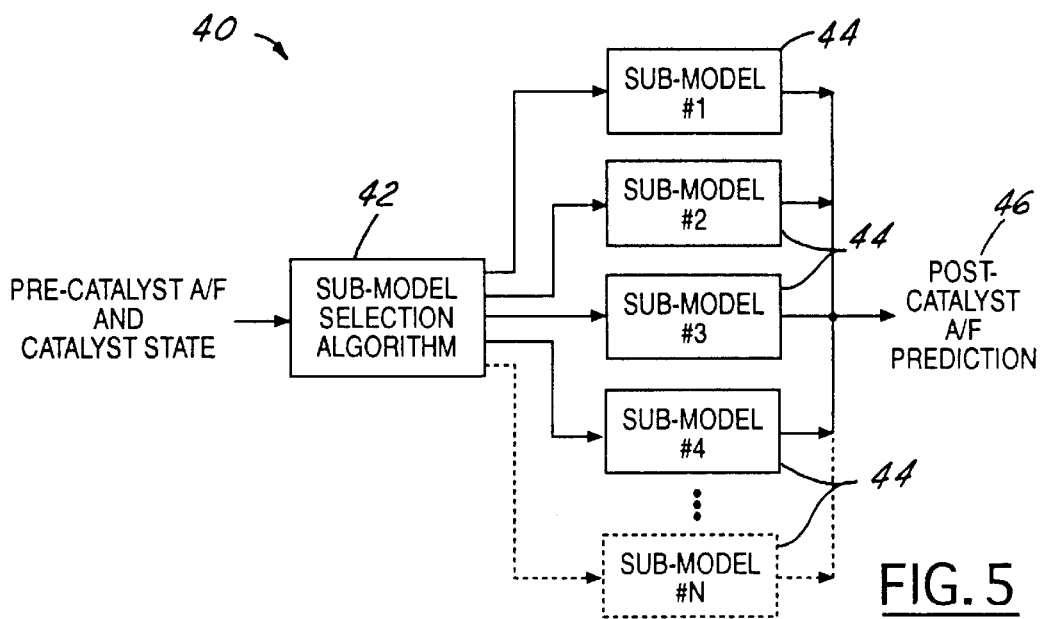
FIG. 5 is a block diagram of the TWC model of the present invention initiated by a selection algorithm.

The model of the present invention has a hybrid state space made of both continuous and discrete states. Every sub-region in the TWC dynamic behavior is mapped to a unique sub-region in the hybrid state space, and a particular sub-region's model becomes active when each and every one of the sub-region's attributes are true. The union of all the sub-regions in the hybrid state space is the global hybrid state space. The intersection of any two sub-regions is zero. FIG. 5 is a block diagram of the TWC sub-model selection process 40. In practice, a selection algorithm 42 requires the precatalyst A/F and the catalyst states as inputs. The output of the sub-model selection algorithm 42 activates or deactivates each of the distinct sub-models 44 as their attributes are met or not met.

Figure 6:
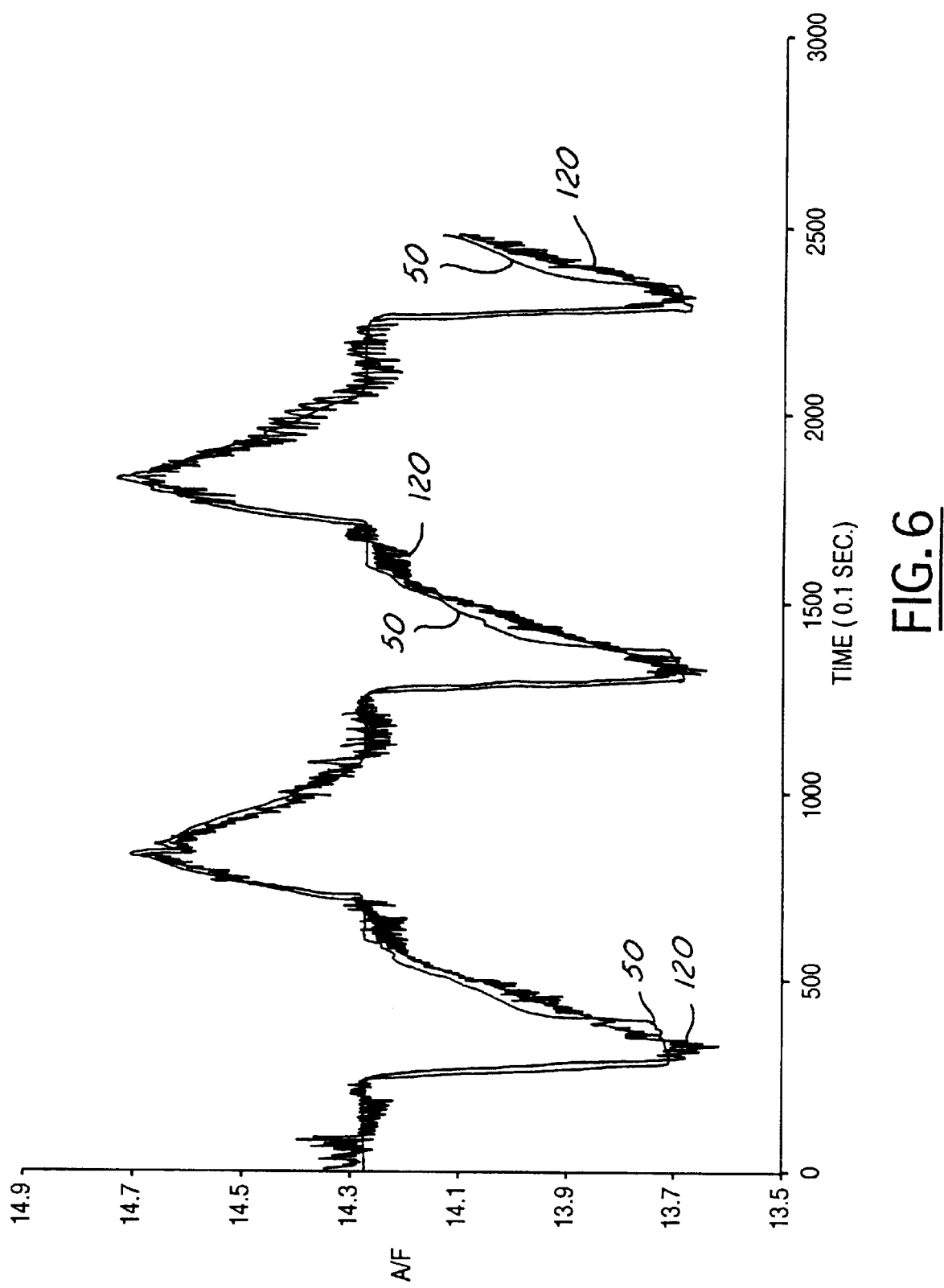
FIG. 6 is a graph comparing the A/F prediction of the TWC model of the present invention with a measured A/F.

The result is a prediction of the post-catalyst A/F 46 that closely approximates the measured A/F. FIG. 6 is a graph representing the A/F prediction 50 of the present invention compared to the measured A/F 120. The model closely approximates the measured A/F.

Some examples of how to construct sub-models for the sub-regions that are shown in FIG. 4 will be discussed herein. Sub-region 1 represents a dead-band period which is defined as the TWC behavior during the time period in which the pre-catalyst A/F is rich while the post-catalyst A/F is at stoichiometry. The dead-band period is a direct indication of how much, and for how long, rich A/F excursion could occur without causing a rich A/F breakthrough.

Figure 7:
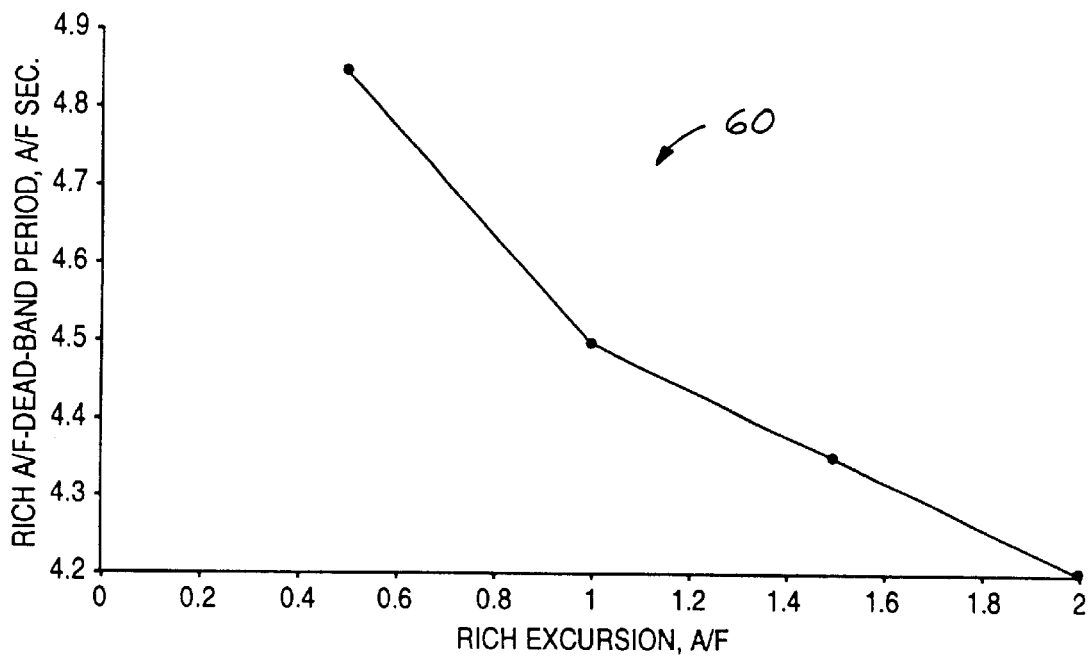
FIG. 7 is a graph representing rich A/F dead-band period.

The rich A/F dead-band period is the product of the dead-band period and the amplitude of the pre-catalyst rich A/F applied during the dead-band period. FIG. 7 is a graph of the rich A/F dead-band period 60, in A/F sec, for different rich A/F excursions. The graph of FIG. 7 is the result of engine dynamometer experiments that isolated and quantified several TWC dynamic behavior phenomena. One skilled in the art is capable of performing such experiments without further explanation. As indicated in FIG. 7, the rich A/F dead-band period appears to be slightly different for different rich A/F excursions.

Reducing species can be defined as the rich components in the exhaust emission constituents from automotive vehicles. The TWC has a certain capacity to store reducing species, known as the reducing species storage capacity. FIG. 7 suggests that if a constant TWC reducing species storage capacity is used, the results of the model may not be accurate. Therefore, an appropriate correction factor should be used. The proposed correction factor is:

$$CF_R = [b_5 - b_6][b_6]^{-1}[\text{pre-catalyst rich } A/F - 0.5][2.0 - 0.5]^{-1}$$

such that a sub-model approximating the filling of the reducing species storage capacity would be:

$$[\text{pre-catalyst rich } A/F * \text{time}][1 + CF_R]$$

where $b_5$ and $b_6$ are constants that can be determined from FIG. 7. Based on FIG. 7, the values of these constants are approximately:

$b_5 = 4.85$ A/F sec
$b_6 = 4.2$ A/F sec

This sub-model is the sub-model of sub-region 1 in FIG. 4. It approximates the relation shown in FIG. 7 to a linear relation. For an even more accurate representation it is possible to use separate sub-models for the pre-catalyst rich A/F excursions less than one and the pre-catalyst rich A/F excursions greater than or equal to one.

This sub-model is activated if the following attributes are met: the TWC reducing species storage is less than a predetermined limit, the pre-catalyst A/F is rich, and zero oxidizing species is stored in the TWC. Oxidizing species can be defined as the lean components in the exhaust emission constituents from automotive vehicles. The attributes of every sub-region are determined based upon a working knowledge of the behavior of the system being modeled.

Figure 8:
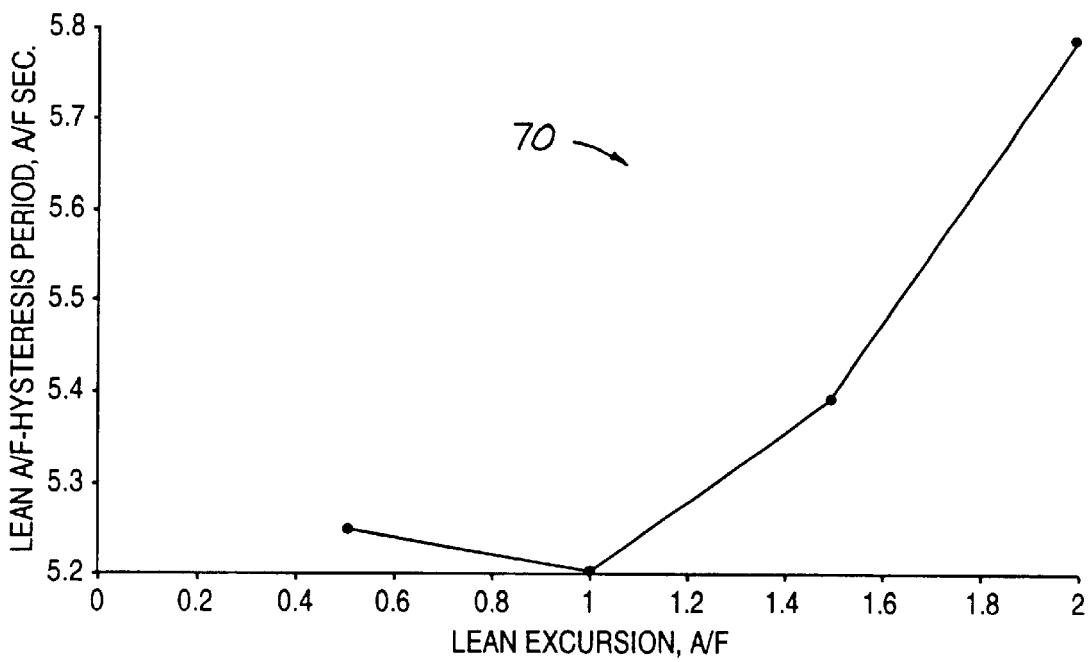
FIG. 8 is a graph representing lean A/F hysteresis period.

Another example of a sub-model is explained with reference to sub-regions 4 and 5 in FIG. 4. The identification of sub-regions 4 and 5 requires a working knowledge of the behavior of a TWC system. FIG. 8, compiled based on test results, shows a lean A/F hysteresis period 70, in A/F sec, for different lean excursions. The hysteresis period is described herein below with regard to sub-regions 4 and 5. Hysteresis period is a metric that the present invention introduces to better understand the dynamic behavior of the TWC.

Sub-regions 4 and 5 represent the TWC hysteresis behavior which is defined as the TWC behavior during the period at which the post-catalyst sensor reads a rich A/F, while the pre-catalyst A/F is lean. To define the hysteresis behavior, assume a TWC at a rich breakthrough initial condition, and assume that at this initial condition a lean excursion is applied. The time period from applying the lean excursion until the post-catalyst UEGO sensor reads a stoichiometric A/F is defined as the hysteresis period. The lean A/F hysteresis period, shown in FIG. 8, depends on the value of the lean A/F excursion.

The TWC has a certain capacity to store oxidizing species known as the oxidizing species storage capacity. Using a constant TWC oxidizing species storage capacity may result in inaccurate results for the TWC model. Therefore an appropriate correction factor should be used. The correction factor is a function of the lean A/F excursion and is defined as follows:

for lean $A/F \geq 1$, $CF_L = [b_7 - b_8][b_8]^{-1}$[pre-catalyst lean $A/F - 1.0$][$2.0 - 1.0$]$^{-1}$ for lean $A/F < 1$, $CF_L = 0$ such that the corrected lean A/F hysteresis period, in A/F sec, will be:

[pre-catalyst lean $A/F$*time]*[$1-CF$]

where $b_7$ and $b_8$ are constants derived from FIG. 8 and are approximately 5.8 and 5.2 respectively. An even more accurate sub-model can be constructed by using two different correction factors for the two pre-catalyst lean A/F ranges, i.e. less than one, and greater than or equal to one.

The division of the region consisting of sub-regions 4 and 5 into two regions is important to the accuracy of the TWC model, and is an example of how a working knowledge of the system being modeled will increase the accuracy of the model through properly designating sub-regions. A lean breakthrough may follow a period of time during which the post-catalyst A/F is stoichiometric and the pre-catalyst A/F is lean or the lean breakthrough might be crossing the stoichiometric from a rich A/F.

Figure 9:
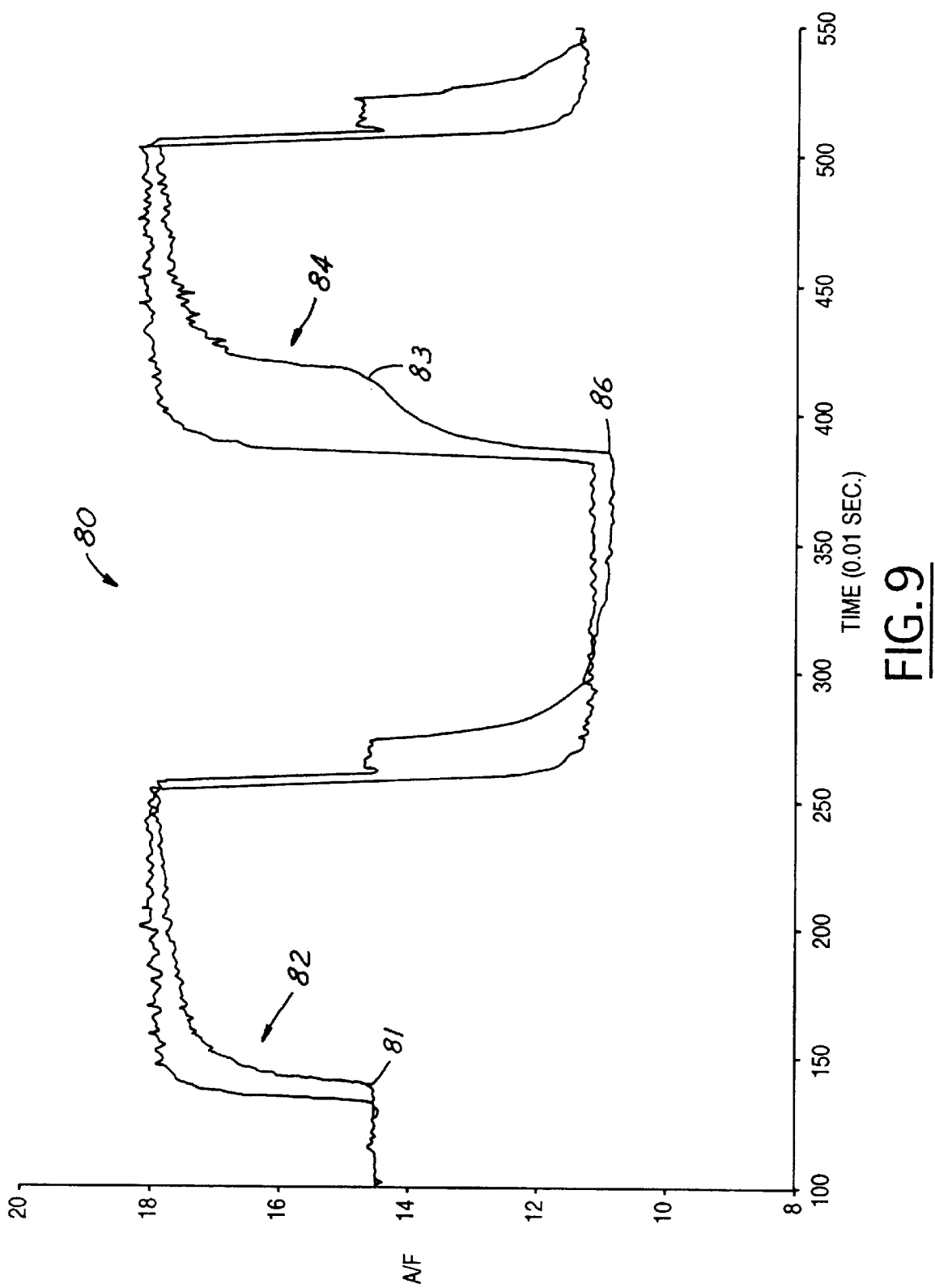
FIG. 9 is a graph representing two types of lean breakthrough.

The subdivision of sub-regions 4 and 5 is further described with reference to FIG. 9. FIG. 9 shows lean breakthrough 80 in two different ways. The region referred to by 82 represents lean breakthrough following a period of stoichiometric post-catalyst A/F where the transition occurs at a state labeled 81. The region referred to by 84 represents lean breakthrough crossing stoichiometric from a rich A/F where the transition occurs at a state labeled 83.

Both kinds of lean breakthrough, 82 and 84, start from the same catalyst state, as far as post-catalyst A/F modeling is concerned. In other words, the states 81 and 83 must be the same. Therefore, at state 83, the TWC must have already stored an amount of oxidizing species equal to the deadband oxidizing species storage capacity. However, at the state designated by 86, the TWC must be saturated with reducing species. Therefore, it becomes clear that the hysteresis period should be divided into more than one sub-region.

In the sub-region designated by 4 in FIG. 4, the TWC will release its storage from the reducing species. In the sub-region designated by 5 in FIG. 4, the TWC will store oxidizing species. At first glance it would appear that only one sub-region would be needed for the region comprising both sub-regions 4 and 5. The division of the region comprising sub-regions 4 and 5 is an example of how an understanding of the system being modeled will enhance the accuracy of the model by allowing more descriptive sub-regions to be distinguished.

As seen in the preceding examples, the modeling of each sub-region is accomplished by assigning formulas to mathematically model each sub-region. The sub-models are not activated until each of its attributes, or conditions, are met. For example, for sub-region 6, the sub-model will be activated if, and only if, the oxidizing species stored in the TWC is above a predetermined limit, the pre-catalyst A/F is lean, and the TWC is not lean saturated.

In general, in the model of the present invention, the dynamic system is divided in sub-regions, and each sub-region has a sub-model constructed that represents each sub-region. Each sub-model is assigned unique attributes at which the sub-model is activated. It should be noted that a larger or smaller number of sub-regions than presented in the foregoing example can be utilized based on the model's use and needs. In order to construct the sub-models and assign the attributes, it is preferred to have a working knowledge of the dynamic system being modeled.

It is also possible to implement a "fail-safe" sub-model into the model of the present invention. The "fail-safe" sub-model will take over if the model selection algorithm fails to activate any of the other sub-models when necessary. As one example, a "fail-safe" sub-model could be to set the current outputs of the TWC model the same as the previous outputs.

While the invention has been described in connection with preferred embodiments, it will be understood that the invention may be changed and modified without departing from the scope of the invention as defined by the following claims.

What is claimed is:

1. A method for computer modeling a dynamic system for a three-way catalyst to control an air-to-fuel ratio in an internal combustion engine, the three-way catalyst having a system response, said method comprising the steps of:

dividing the system response into a plurality of separate and distinct sub-regions by isolating dynamic phenomena in the system response;

assigning attributes to each of said plurality of sub-regions based on parameters of said three-way catalyst system;

generating a sub-model for each of said plurality of sub-regions using the assigned attributes, the sub-model being a mathematical representation of a corresponding sub-region;

activating the sub-model for a corresponding sub-region when each and every attributed assigned to the corresponding sub-region is true, and wherein no two sub-regions are simultaneously active, thereby defining discrete states for each sub-region of the system response;

controlling the air-to-fuel ratio based on said active sub-model.

2. The method as claimed in claim 1 wherein said step of dividing the system response further comprises:

defining a first sub-region representing three-way catalyst behavior during a pre-catalyst rich air-to-fuel ratio and a post-catalyst stoichiometric air-to-fuel ratio;

defining a second sub-region representing three-way catalyst behavior during a post-catalyst rich air-to-fuel ratio and a lean pre-catalyst air-to-fuel ratio and wherein a reducing species is released from storage;

defining a third sub-region representing three-way catalyst behavior during a post catalyst rich air-to-fuel ratio and a lean pre-catalyst air-to-fuel ratio and wherein an oxidizing species is stored; and defining a fourth sub-region representing three-way catalyst behavior during periods when a stored oxidizing species is above predetermined limit value, the pre-catalyst air-to-fuel ratio is lean, and the three-way catalyst is not lean saturated.

3. The method as claimed in claim 1 further comprising the steps of:

defining a fail-safe sub-model;

activating said fail-safe sub-model during periods of time when no other sub-model corresponding to a sub-region is active.

* * * * *